(No Model.) 4 Sheets—Sheet 2.

T. H. STACKHOUSE.
TYPE WRITING MACHINE.

No. 536,303. Patented Mar. 26, 1895.

WITNESSES:

INVENTOR
Thomas H. Stackhouse
by his attorney
Chas. A. Petter.

(No Model.)  
4 Sheets—Sheet 3.

T. H. STACKHOUSE.
TYPE WRITING MACHINE.

No. 536,303.  Patented Mar. 26, 1895.

WITNESSES:  
H. V. Loss  
Stevenson H. Walsh

INVENTOR  
Thomas H. Stackhouse  
by his attorney  
Chas. A. Reutter (No Model.)  T. H. STACKHOUSE.  4 Sheets—Sheet 4.
TYPE WRITING MACHINE.

No. 536,303.  Patented Mar. 26, 1895.

WITNESSES:
H. V. Loss
Stevenson H. Walsh

INVENTOR
Thomas H. Stackhouse
by his attorney
Chas. A. Rutter

UNITED STATES PATENT OFFICE.

THOMAS H. STACKHOUSE, OF PHILADELPHIA, PENNSYLVANIA.

TYPE-WRITING MACHINE.

SPECIFICATION forming part of Letters Patent No. 536,303, dated March 26, 1895.

Application filed February 7, 1894. Serial No. 499,368. (No model.)

*To all whom it may concern:*

Be it known that I, THOMAS H. STACKHOUSE, a citizen of the United States, and a resident of the city and county of Philadelphia, State of Pennsylvania, have invented certain new and useful Improvements in Type-Writing Machines, of which the following is a specification.

My invention relates to improvements in type writing machines, and more particularly to improvements in mechanism for driving the carriages of type writing machines, and the object of my invention is to furnish a type writing machine the carriage of which may be driven in either direction.

English and most other European languges are written from left to right, and type writing machines for writing these languages are consequently so constructed that their carriages move, during the writing, from right to left. Machines of this character are not adapted for writing the languages that are written from right to left, notably the Hebrew, and it is my purpose to furnish a machine the carriage of which may be driven during the writing either from right to left or from left to right as may be required by the language that is being written.

Figure 1:
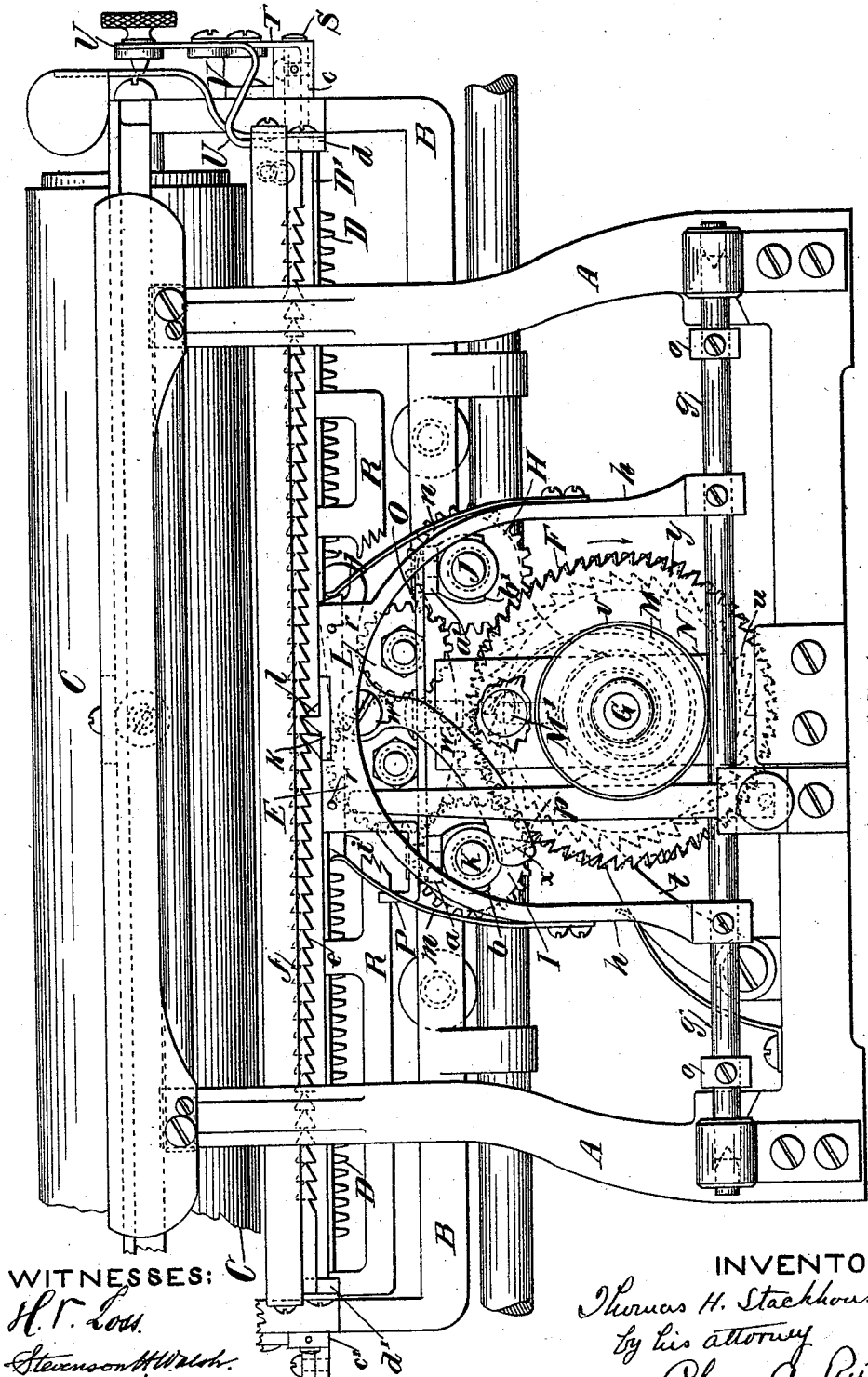
Figure 2:
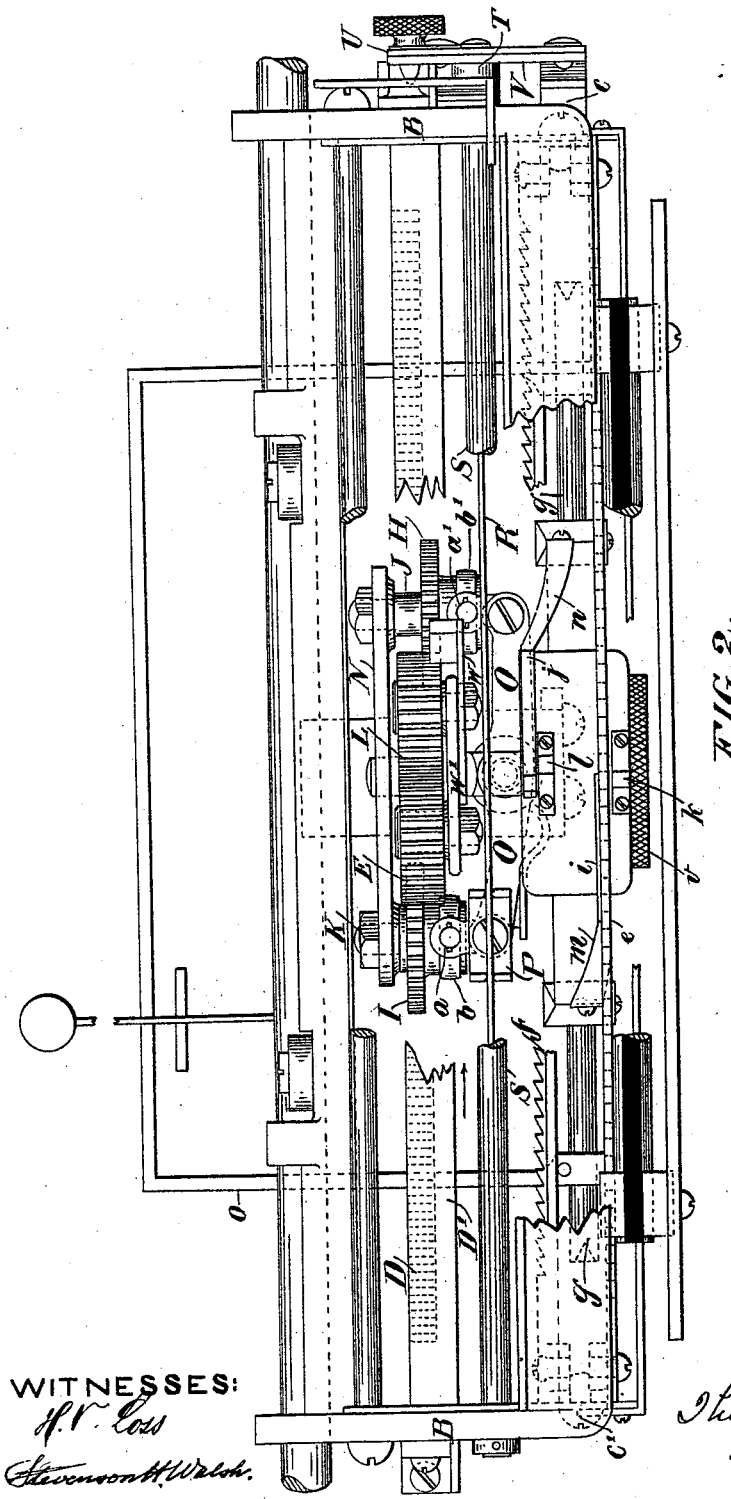
Figure 3:
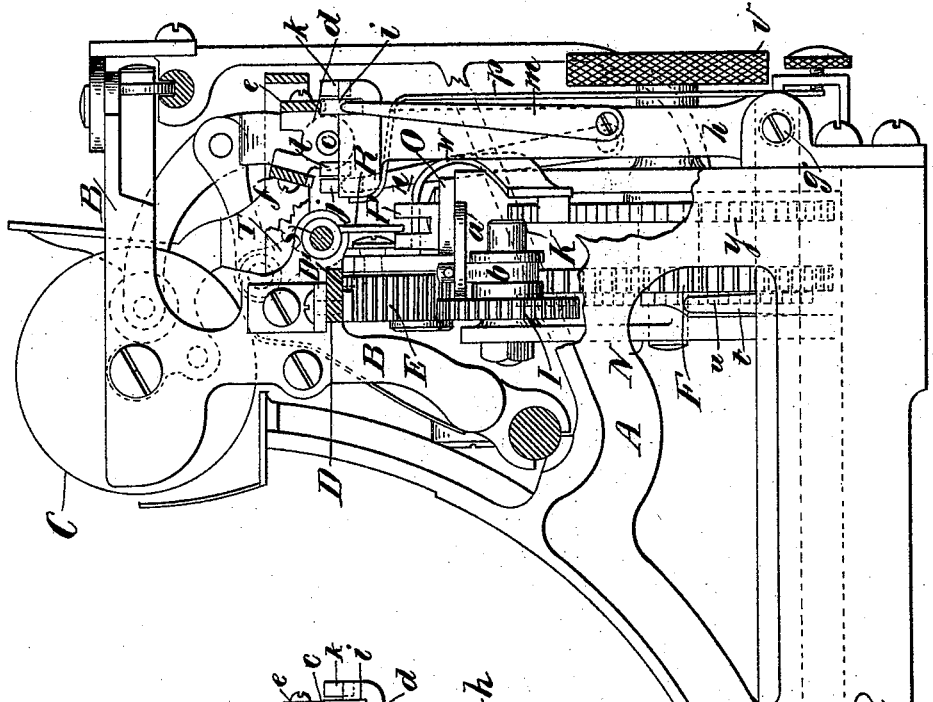
Figure 4:
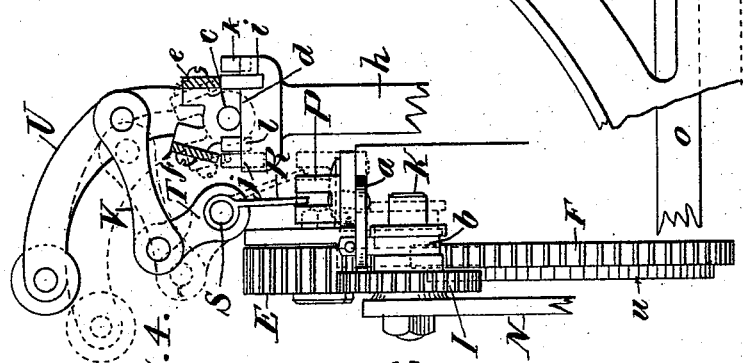
Figure 5:
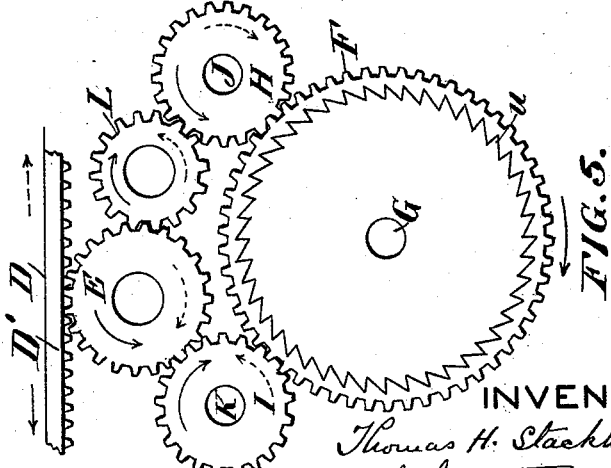
Figure 6:
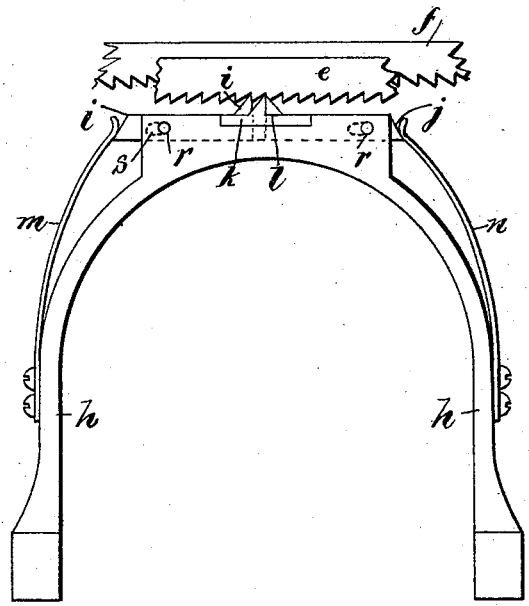
Figure 7:
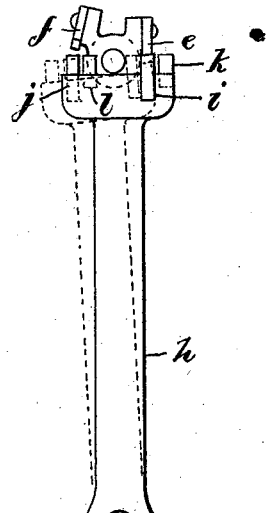
Figure 8:
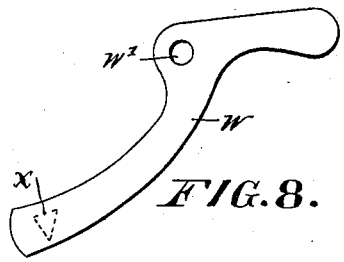
Figure 9:
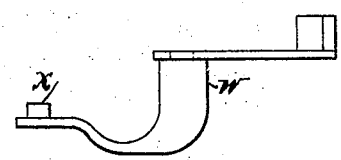
Figure 10:
Figure 11:
Figure 12:
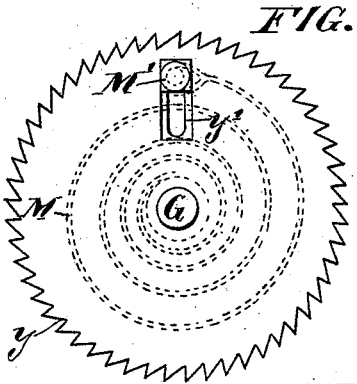

In the accompanying drawings forming part of this specification and in which similar letters of reference indicate similar parts throughout the several views, Figure 1, is a rear elevation of a type writing machine embodying my improvements; Fig. 2, a plan of the rear part of machine furnished with my improvements, the plate being removed and some of the parts broken away so as to show my attachments more clearly; Fig. 3, a side elevation of the rear part of a machine furnished with my improvements, part of the frame of the machine being broken away; Fig. 4, a side elevation of the double escapement motion, the levers for operating the double racks, the gearing by which the carriage may be driven in either direction, and the mechanism for throwing the intermediate gears into or out of action with the main driving gear; Fig. 5, a front elevation of the main driving gear, the rack which is secured to the carriage, and the intermediate gears between the main gear and the rack; Fig. 6, a rear elevation of the spacing pawls or dogs, the rocking frame which carries them, and part of the double ratchets; Fig. 7, a side elevation of Fig. 6; Fig. 8, a rear elevation of pawl for engaging ratchet to prevent spring from unwinding when carriage is removed from machine; Fig. 9, a plan of Fig. 8; Fig. 10, a plan of rocking lever which connects collars on hubs of intermediate gears; Fig. 11, a plan of Fig. 10; Fig. 12, a front elevation of rear ratchet which is loose on shaft to which the driving spring is secured, and Fig. 13, a central sectional elevation through the driving spring, the front and rear ratchets on the shaft to which said spring is secured, and the main driving gear.

A is the frame which supports the carriage and its connected parts; B, the carriage frame; C, the platen; D, a rack secured to the carriage; E, a gear wheel gearing with rack D; F, a gear wheel fast upon a shaft G; H, I, gear wheels carried loosely on studs J, K, Figs. 1, 2, and 3, and which are adapted to engage alternately with and be driven by gear F. The gear I gears directly with gear E, and the gear H gears with an intermediate gear L which gears with gear E.

Figure 13:
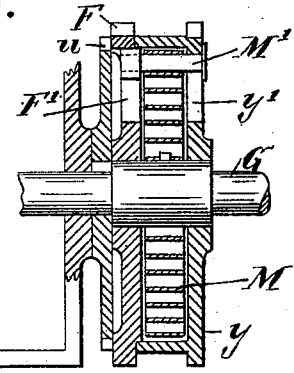

The shaft G and gear F are driven, when the machine is in use, by a coil spring M, shown by dotted lines in Figs. 1 and 12 and by full lines in Fig. 13, the arrows in full lines in Fig. 5 showing the movement of the wheels when the gear H is in gear with and driven by gear F.

In the drawings the gear I is shown out of contact with gear F but is in gear with gear E and is running idly, the rack D and the carriage being driven as shown by the arrows in full lines, that is from left to right as the operator faces the key board.

If it be desired to reverse the driving of the carriage the gear H is thrown out of contact with gear F and the gear I into contact with it, the mechanism for accomplishing this being as follows: The gears H, I, are carried upon studs J, K, which are carried by a suitable frame N which may form part of frame A or be secured to said frame.

O is a lever pivoted at its middle to a suitable support, and the ends of which are pivotally secured to one end of links *a*, *a'*, the other ends of which are pivotally attached to the upper ends of forks *b*, *b'* which pass downward and upon each side of a groove cut upon the hubs of gears H, I.

Upon one end of lever O and pivotally connected to said lever is a U shaped frame P the ends of which project upwardly and are furnished with slots into which the lower end of a frame R, which is carried by a shaft S, passes. One end of shaft S is furnished with a crank T, Figs. 1, 2, 3 and 4, which is connected with a lever U by a link V.

When it is desired to reverse the movement of the carriage, the lever U is thrown over, as shown by dotted lines in Fig. 4, pushing over link V and crank T and rocking shaft S and causing the frame R to be thrown out as shown by dotted lines. This frame moves the frame P out, or in, as the case may be, and throws one end of lever O in one direction and its other end in the opposite direction and causes one gear, as I, to be thrown into gear with gear F, and the other gear, as H, out of gear with gear F. The faces of gears E, L, are much broader than the face of gear F, so that these gears may be at all times in gear with gears H, I. It will be understood that this construction of the gears may be reversed, that is the gears E, L, may have narrow faces and the gears H, I, broad faces.

As the carriage may be driven in either direction it is necessary that it be furnished with two spacing devices, one of which will control its movement in one direction, and the other its movement in the opposite direction. These spacing devices are so arranged that they are thrown into and out of operative action simultaneously with that one of the driving devices whose motion they limit.

The lever U, through which the gears H, I, are thrown into or out of operative action with the driving gear F, has its lower end secured to a shaft or stud $c$ which is carried in suitable bearings in the carriage frame B. Upon the opposite end of the carriage frame is a similar shaft or stud $c'$. Secured to shafts $c, c'$, are collars $d, d'$, to which are secured two ratchets $e, f$. Suitably pivoted to frame A of the machine, or to bearings carried by this frame, is a rod $g$, and secured to this rod is an upwardly projecting arm $h$ the upper end of which is furnished with two movable pawls $i, j$, and two stationary pawls $k, l$. The pawls $i, k$, are adapted to engage ratchet $e$, the pawls $j, l$, to engage the ratchet $f$.

$m, n$, are springs carried by arms $h$ the free ends of which engage the outer ends of the movable pawls $i, j$, and return these pawls to their first positions after having been moved forward by the movement of the carriage as hereinafter described.

The key board, the type bars, the type, &c., are not shown as their arrangement and construction are so well known as to render this unnecessary. It will be understood that they may be of any of the well known and suitable patterns. It will be also understood that in writing English and Hebrew for instance, two complete sets of type bars, key boards, &c., should be used, one being removed from the machine in order to make place for the other, or other suitable provision should be made for the use of the different letters or characters that may be necessary in writing the different languages.

In the drawings the machine is shown geared so as to drive the carriage from left to right, as the operator faces it and its operation is as follows: One of the keys being struck depresses the lever $o$ which is fast to rock shaft $g$. This rocks shaft $g$ and moves in arm $h$ which is fast to this shaft. As the upper end of this arm is moved in, movable pawl $i$ is moved out of contact with the tooth on ratchet $e$ which it is engaging and at the same instant the stationary pawl $k$ is moved into contact with the next tooth on this ratchet and prevents the ratchet and the carriage from moving. As soon as movable pawl $i$ is moved out of contact with the teeth of the ratchet the spring $m$ throws this pawl back until it is directly opposite stationary pawl $k$, and when the key is released the spring $p$, Figs. 1 and 3, returns arm $h$ and its connected parts to their first position, drawing the stationary pawl out of contact with ratchet $e$ and moving the movable pawl into contact with that tooth on this ratchet that the stationary pawl has just left. As soon as this is done the spring M, through gears F, H, L and E, and rack D, drives the carriage forward until it is arrested by the stopping of movable pawl $i$, which may be accomplished by a pin $r$ carried by the arm $h$ and which passes through a slot $s$ in the pawls $i$ or $j$. See Fig. 6. When the machine is to be driven in the opposite direction, the lever U is moved down, as shown by the dotted lines in Fig. 4. The ratchet $e$ is then lifted out of contact with the pawls $i, k$, and the ratchet $f$ is thrown down so as to be engaged by the pawls $j, l$. At the same instant the frame R on shaft S moves out frame P on lever O and this lever moves gear H out of contact with driving gear F and the gear I into contact with gear F and the driving of the carriage will be reversed. When this is done the action of the pawls $j, l$, and the ratchet $f$ will be similar to that described for the pawls $i, k$, and the ratchet $e$.

$t$, Figs. 1 and 3, is a pawl that engages with a ratchet wheel $u$, Figs. 1, 3 and 13, which is fast to shaft G, to which inside end of spring M is secured.

$v$, Figs. 1, 2 and 3, is a thumb wheel upon the end of the shaft G. By means of wheel $v$ the shaft G may be turned in order to wind up or increase the tension of spring M. The ratchet wheel $u$ and pawl $t$ prevent the spring from unwinding.

$w$, Figs. 1, 2, 3, 6 and 7, is a lever which is pivoted at $w'$, and the lower end of which is furnished with a tooth $x$ and the upper end of which is adapted to pass under and to be engaged by a flat surface D', carried by the rack D. Ordinarily the flat surface D' on the rack D engages the upper end of lever $w$ and holds this end down, but if the carriage be removed for any purpose from the machine, the lower end of this lever drops and tooth $x$ engages one of the teeth on the ratchet $y$ and prevents this ratchet and the gear F from revolving and the spring M from unwinding, which it would always do when the carriage was removed from the machine were it not for some device of this kind.

The upper end of spring M is secured to a pin M' which passes through a slot $y'$ in the ratchet wheel $y$ and through a slot F' in gear F. When the carriage is pushed forward so as to commence writing upon a new line, the spring M, as is the case in all type writing machines, is wound up, and when this is done the pin M' is drawn down to the bottom of the slots $y'$, F'. Hence when the spring is tightly wound and exerts its greatest force, this force is applied near the center of the wheel F and ratchet $y$. As the spring unwinds the pin M rises and its force is applied farther from the center of the gear and ratchet. By this device the spring transmits to the gear F and ratchet $y$ very nearly as much power when it is unwound as it does when fully wound.

I do not desire to confine myself to the precise construction that I have shown in my drawings for the details of my invention may be considerably modified without departing from the spirit of my invention, and in applying the invention to type writing machines of a different construction from that shown in the drawings it might be necessary to make modifications in order to adapt the invention to the different construction of the carriage and its connected parts.

Having thus described my invention, I claim—

1. The combination in a type writing machine of a carriage, a main driving spring, mechanism operated by said main driving spring by means of which said carriage may be driven in either direction, mechanism operated by the keys of the machine by means of which the carriage may be caused to move in either direction with a step by step movement, and means by which one set of driving and one set of spacing mechanisms may be thrown out of operative action when the other set are thrown into operative action.

2. The combination with the carriage of a type writing machine and means for driving the same in either direction, of two movable and two stationary pawls, means for operating said pawls and for operating them by the movements of the keys, two ratchets carried by said carriage the teeth of which are inclined in opposite directions and one of which is adapted to be engaged by one set of pawls, the other by the other set of pawls, and means for at the same time throwing one set of pawls and one ratchet into gear and the other set of pawls and the other ratchet out of gear.

3. The combination with the carriage of a type writing machine of a main driving gear and means for driving the same in one direction, mechanism controlled by the keys of the machine for dictating the movements of said driving gear, mechanism actuated by said driving gear for driving the carriage in the opposite direction, mechanism controlled by the keys of the machine for dictating the movements of said second driving gears, and means for throwing said driving mechanisms alternately into and out of operative action.

4. The combination in a type writing machine of a carriage, a rack secured to said carriage, a main driving gear and means for actuating the same, a set of gears driven by said main driving gear for moving said rack and carriage in one direction, a set of gears actuated by said main driving gear for driving said rack and carriage in the opposite direction, means for throwing one set of gears out of operative action with said main driving gear when the other set of gears are thrown into operative action with it, and mechanism, operated through the keys of the machine, for imparting a step by step movement in either direction to said carriage.

5. The combination with the carriage of a type writing machine of a rack secured to said carriage, a gear wheel engaging said rack, a main driving gear and means for actuating the same, an intermediate gear adapted to gear into said main driving gear and into said rack engaging gear, an intermediate gear adapted to gear into said gear and into said main driving gear, and means for throwing one of said intermediate gears out of contact with said main driving gear when the other is thrown into gear with it.

6. The combination with the intermediate gear wheels and the studs upon which they are supported, of a lever pivoted at its center, links pivoted to the ends of said lever and to forks engaging the hubs of said gears, said forks, a slotted frame secured to one of the ends of said lever, a frame extending into said slots, a shaft upon which said latter frame is carried, and means for rocking said shaft.

7. The combination with the carriage of a type writing machine and an actuating spring or springs by means of which said carriage may be moved in either direction, of two escapement movements, one of which is adapted to determine the spacing movement of the carriage in one direction, the other to determine the spacing movement of the carriage in the other direction, and mechanism for throwing one of said escapement movements out of operative action when the other is thrown into operative action.

8. The combination with the carriage of a type writing machine and means for driving the same in either direction, of an arm adapted to be rocked by the action of the keys of the machine, two movable and two stationary pawls carried by said arm, two ratchets carried by said carriage the teeth of which are inclined in opposite directions and one of which is adapted to be engaged by one set of pawls and the other by the other set of pawls, and means for throwing, at the same time, one ratchet into gear with one set of pawls and the other out of gear with the other set of pawls.

9. The combination in a type writing machine of a carriage, a main driving spring, a shaft to one end of which this spring is secured, a gear wheel driven by said spring, a rack upon said carriage adapted to be driven by the movements of said gear wheel, a ratchet fast to said gear wheel, a flat surface upon the rear side of said rack, and a pawl the upper end of which is adapted, when the carriage is on the machine, to be engaged by the flat surface on said rack and be thereby held out of contact with said ratchet and adapted when said carriage is removed from the machine to fall and engage said ratchet, substantially as and for the purposes set forth.

THOMAS H. STACKHOUSE.

Witnesses:
STEVENSON H. WALSH,
CHAS. A. RUTTER.